United States Patent [19]
Planck, Jr. et al.

[11] Patent Number: 6,009,800
[45] Date of Patent: Jan. 4, 2000

[54] ROTATING VARIABLE HEIGHT CLAMPING DEVICE

[75] Inventors: Norman A. Planck, Jr., Madera, Calif.; Eduard Hendrikus Johannes Damhuis, Bousval, Belgium; Sherman Howell Creed, Fresno, Calif.

[73] Assignee: FMC Corporation, Chicago, Ill.

[21] Appl. No.: 08/932,734

[22] Filed: Sep. 11, 1997

Related U.S. Application Data

[62] Division of application No. 08/483,421, Jun. 7, 1995, Pat. No. 5,705,127.

[51] Int. Cl.[7] ............................................. B30B 13/00
[52] U.S. Cl. ....................... 100/35; 100/219; 100/269.01
[58] Field of Search ............................. 100/194, 35, 195, 100/196, 208, 219, 269.01, 288; 414/801, 907; 269/202, 204, 227

[56] References Cited

U.S. PATENT DOCUMENTS

| | | |
|---|---|---|
| 1,612,366 | 12/1926 | Fahrney . |
| 2,629,312 | 2/1953 | Davis . |
| 2,982,063 | 5/1961 | Coleman et al. . |
| 3,779,155 | 12/1973 | Ohno ....................................... 100/207 |
| 4,142,933 | 3/1979 | Graham ............................... 100/208 X |

FOREIGN PATENT DOCUMENTS

| | | | |
|---|---|---|---|
| 3-205220 | 9/1991 | Japan .................................... | 414/907 |

*Primary Examiner*—Janice L. Krizek
*Attorney, Agent, or Firm*—Flehr Hohbach Test Albritton & Herbert LLP

[57] ABSTRACT

The invention uses a lost motion clamping system to provide variable height clamping from the top of one or more stacks. The variable height clamp is then locked in place. A second clamping means then provides additional clamping from the bottom of the stacks.

11 Claims, 11 Drawing Sheets

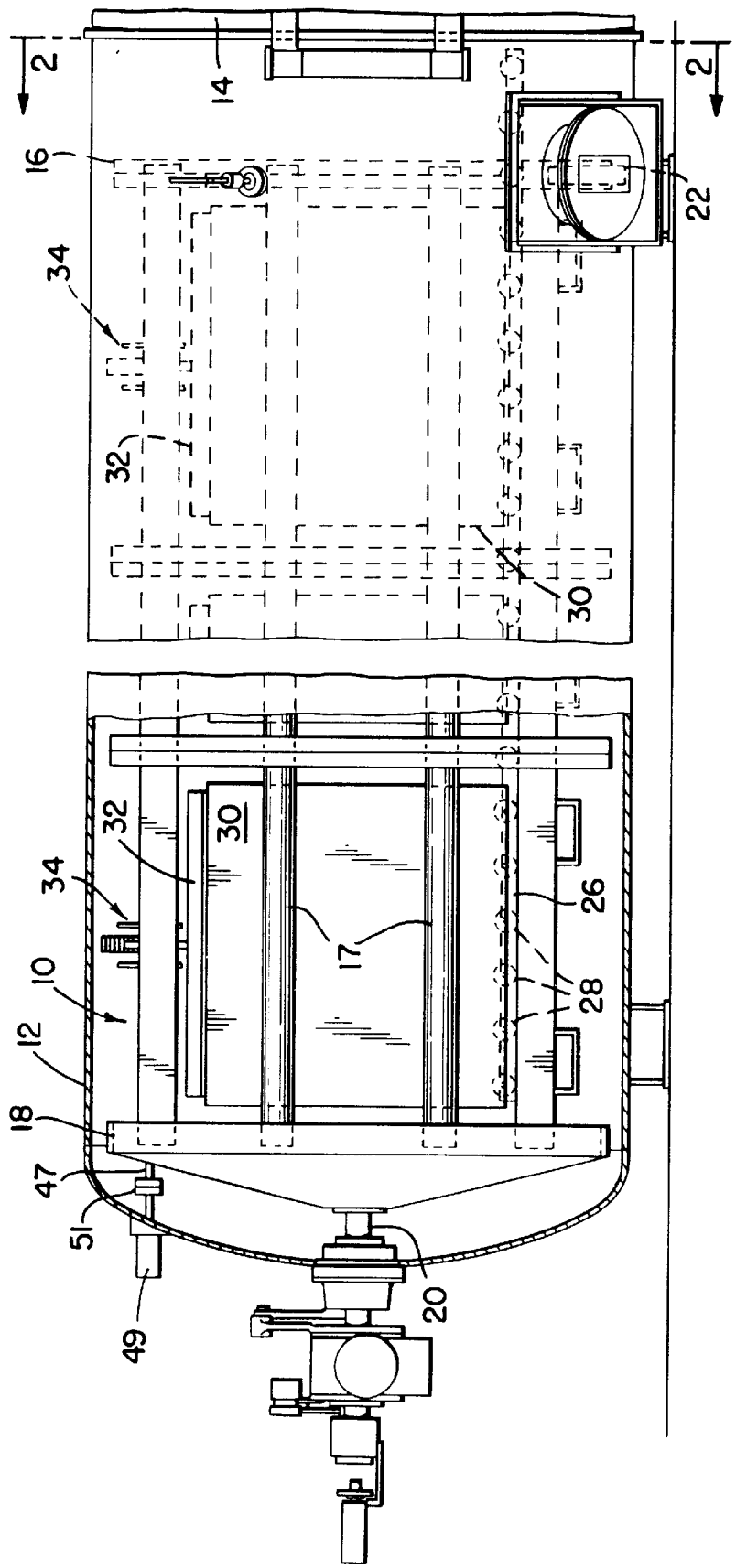

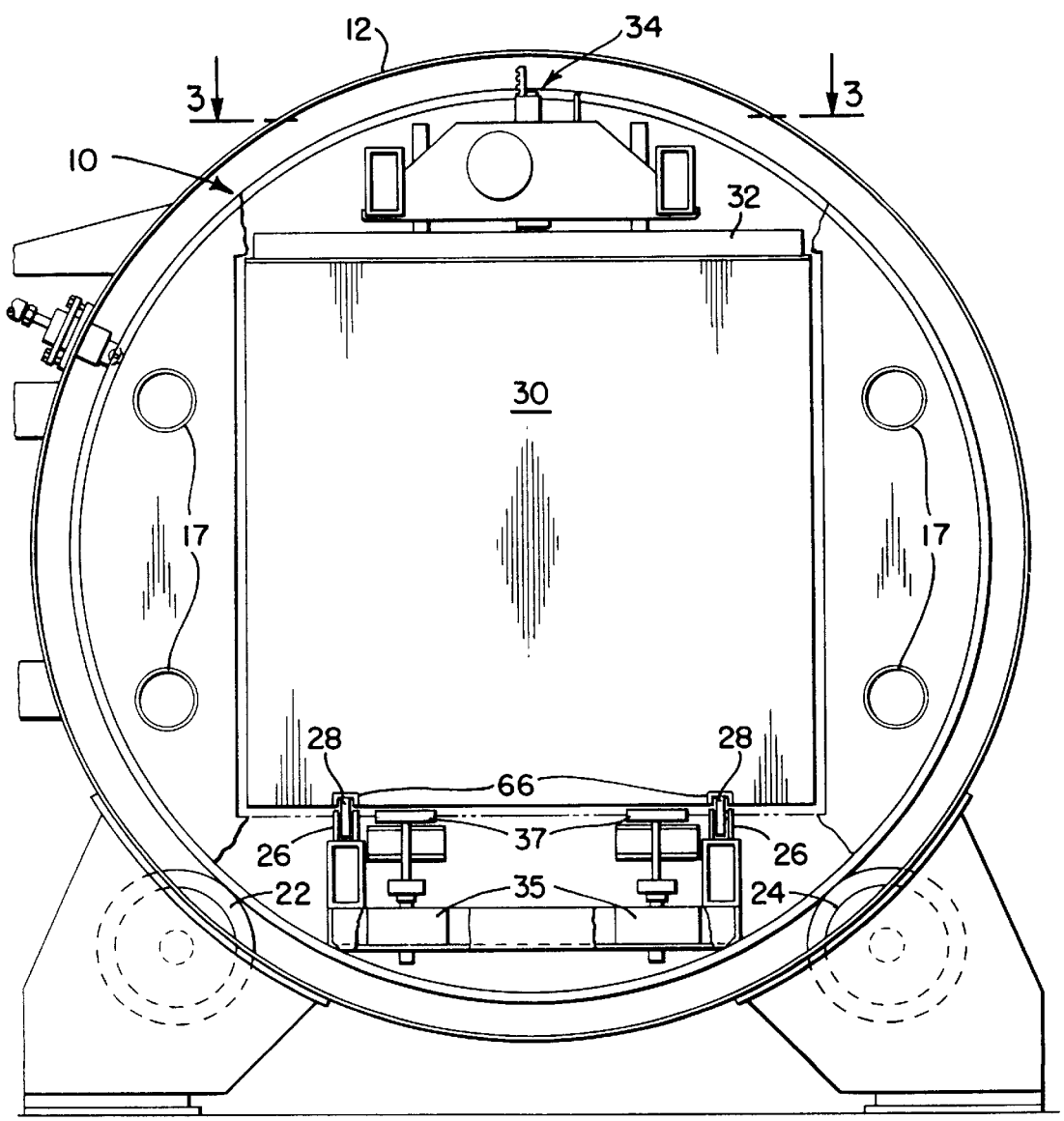
FIG_2

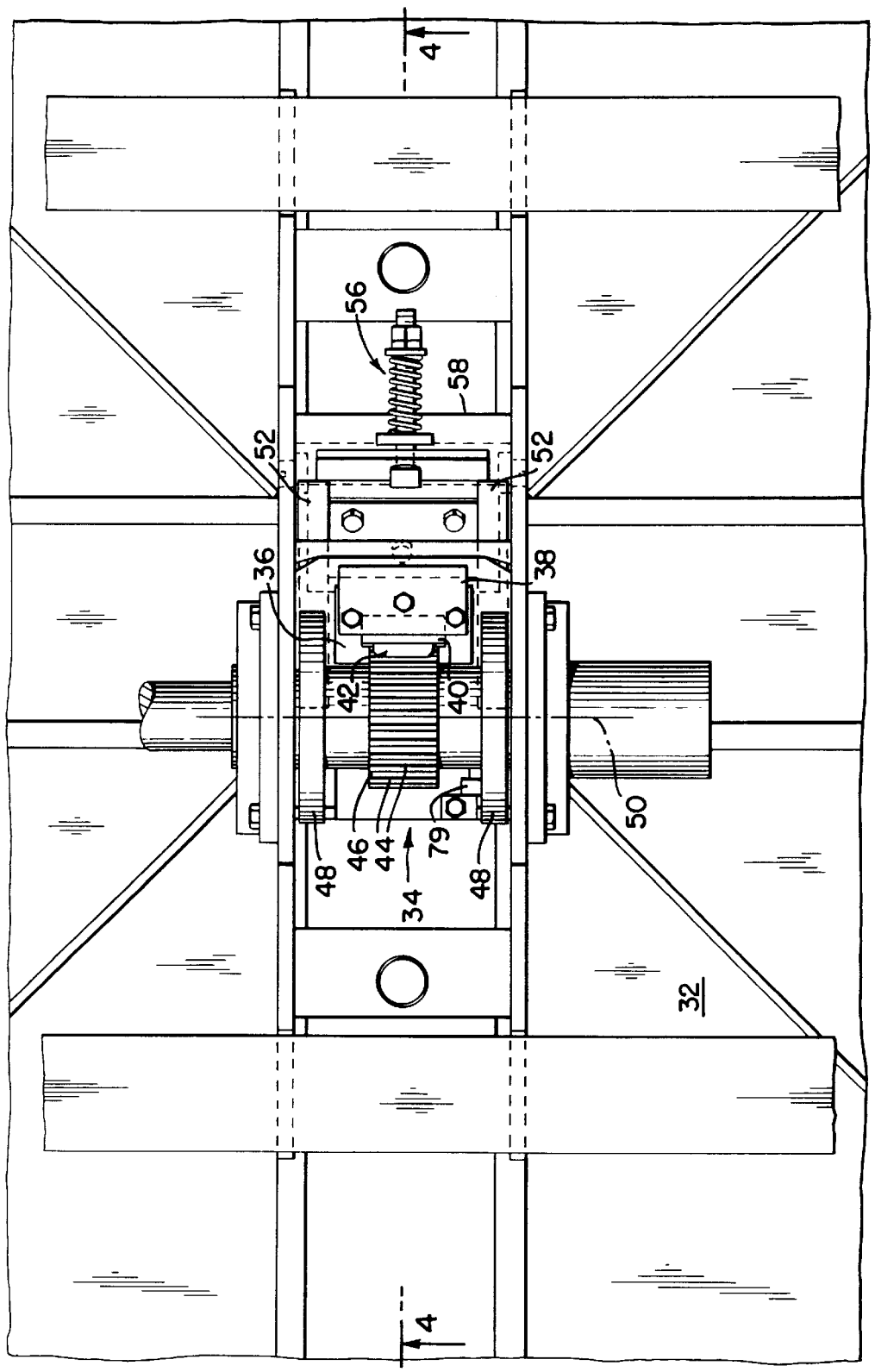

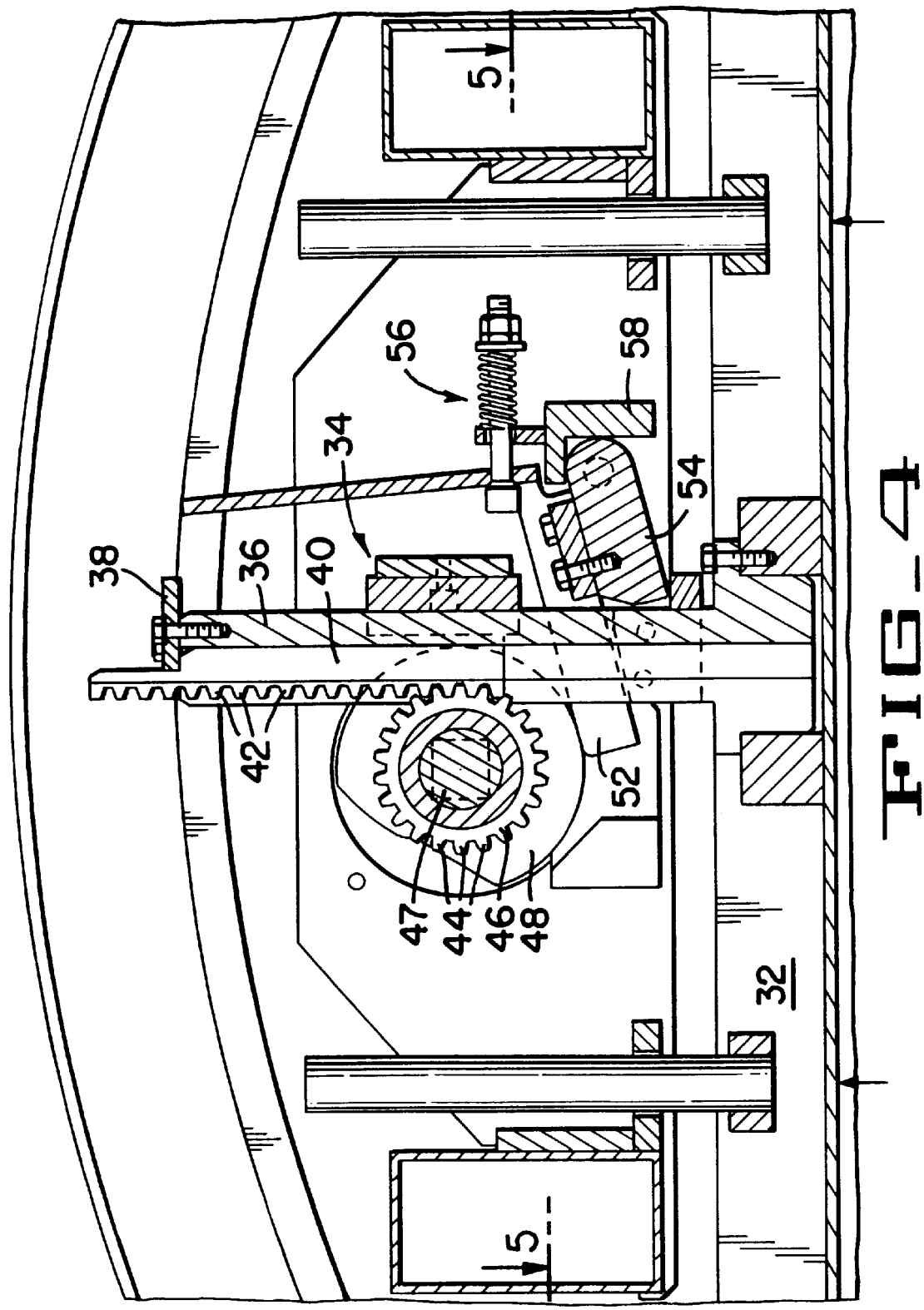
FIG_4

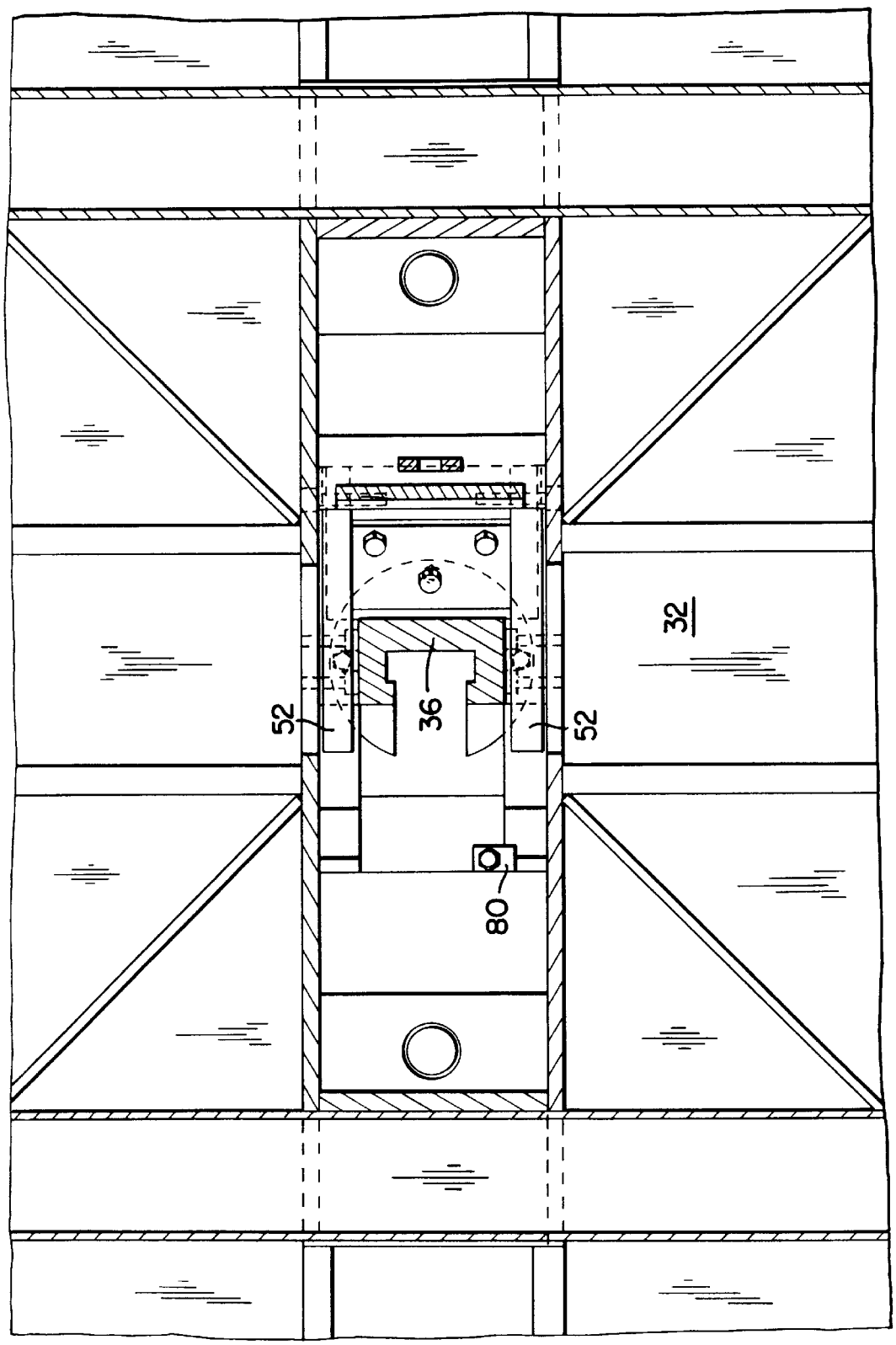
FIG_5

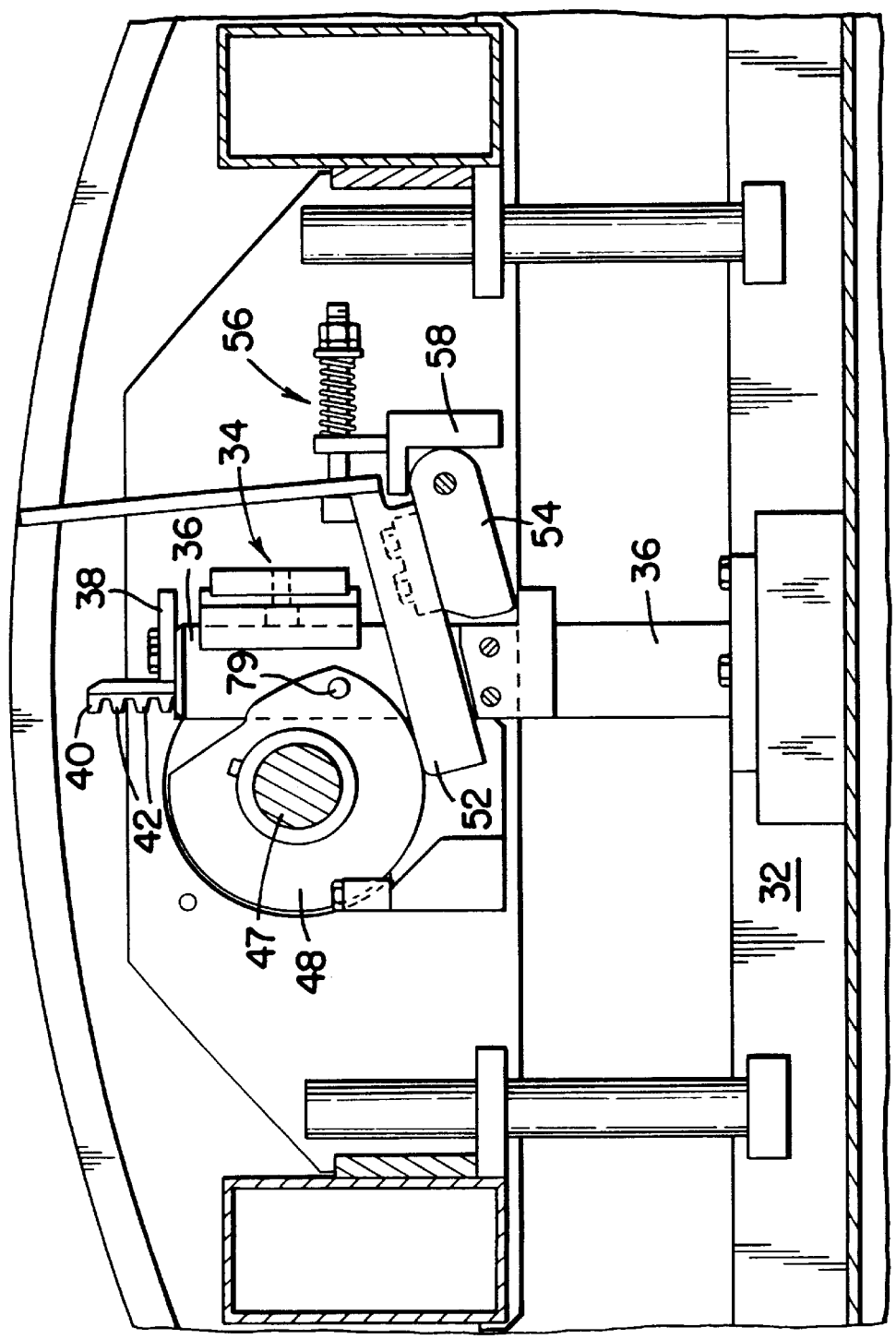

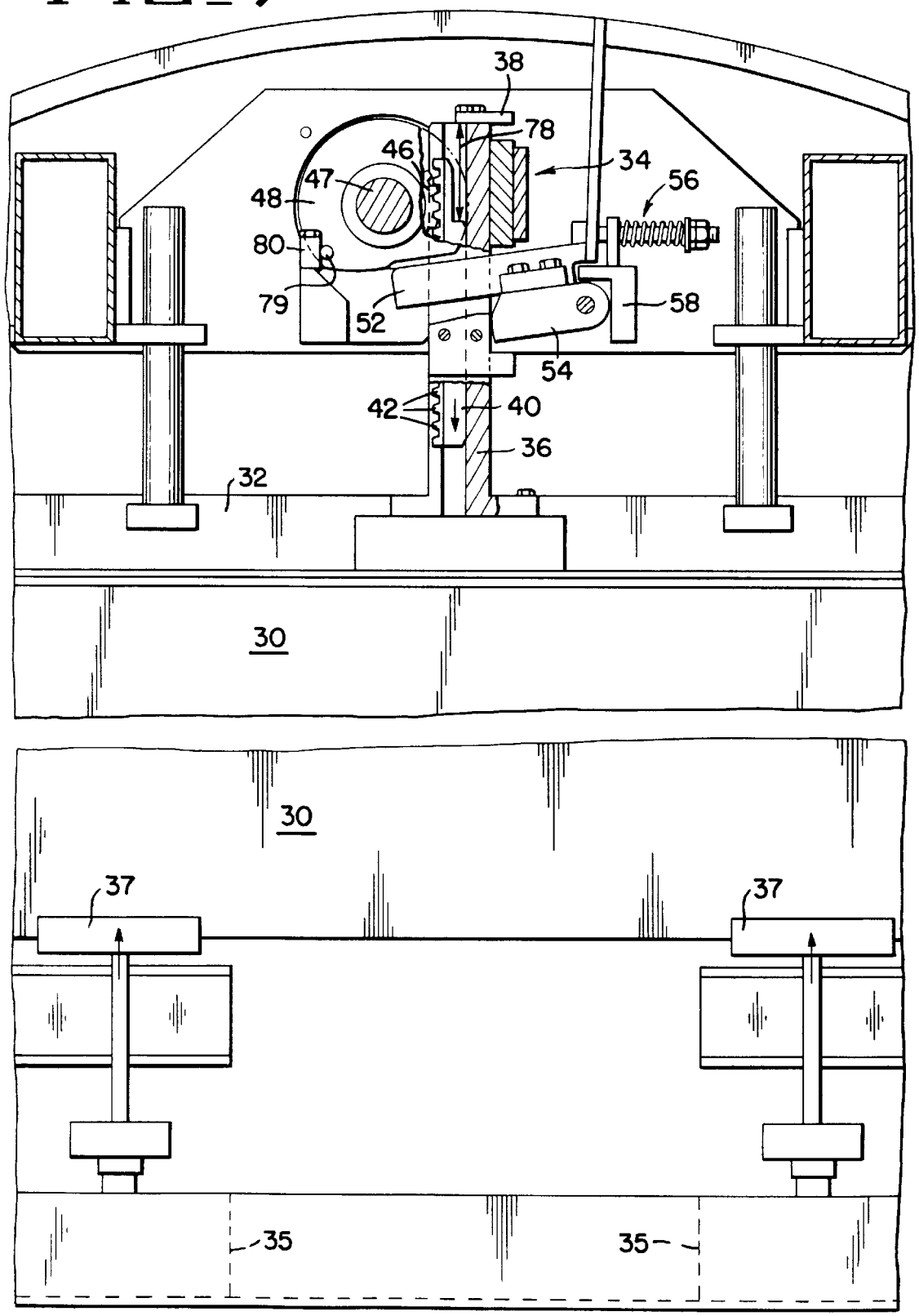
FIG_7

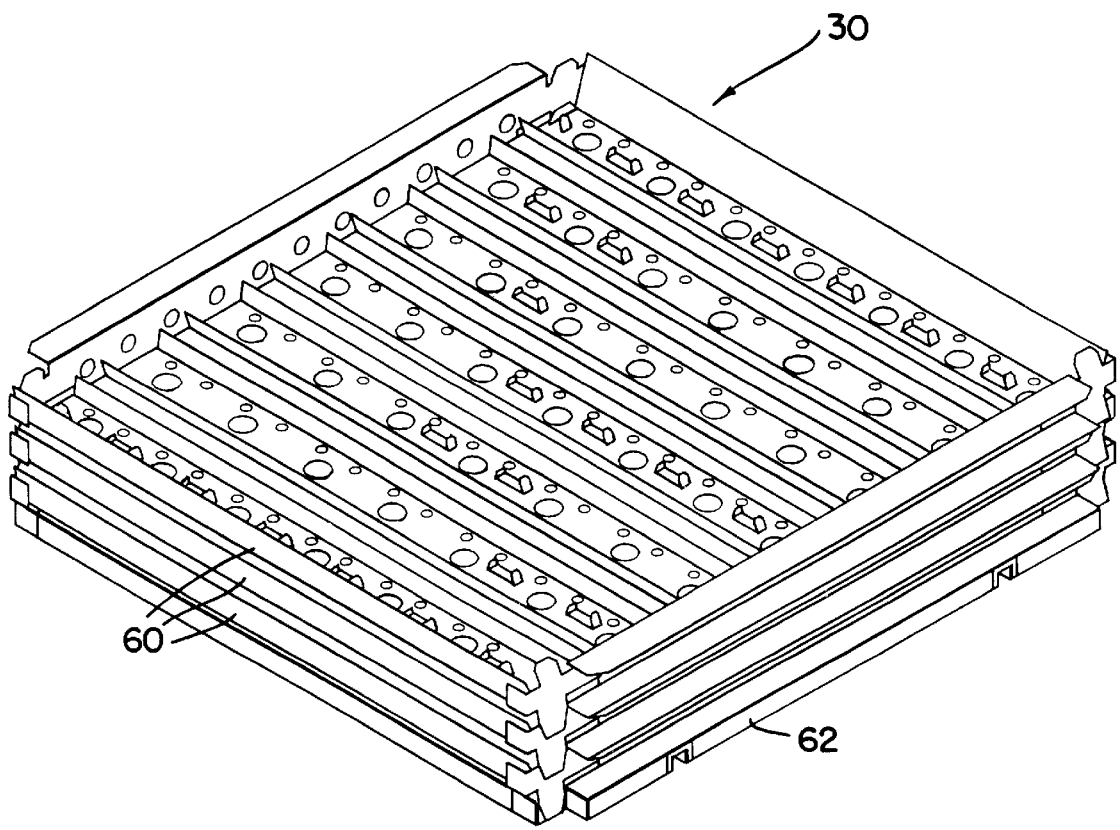
FIG_8
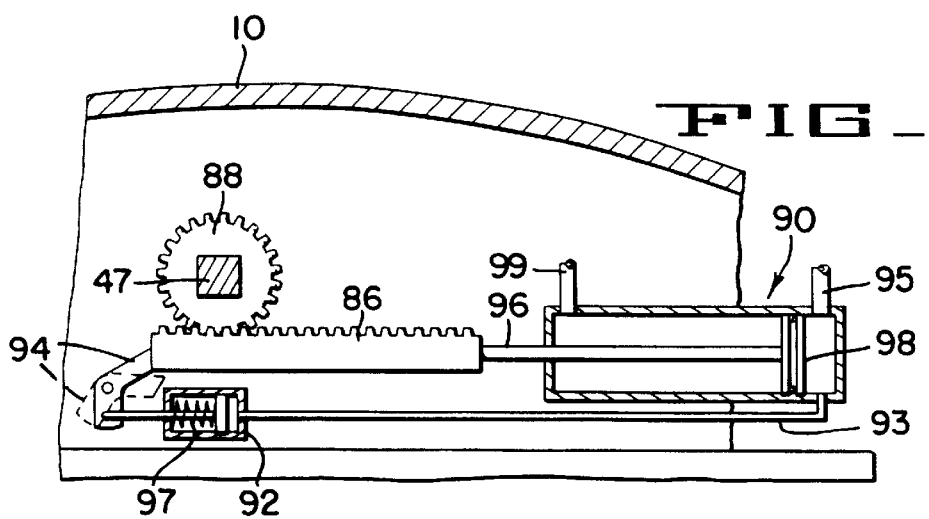
FIG_12

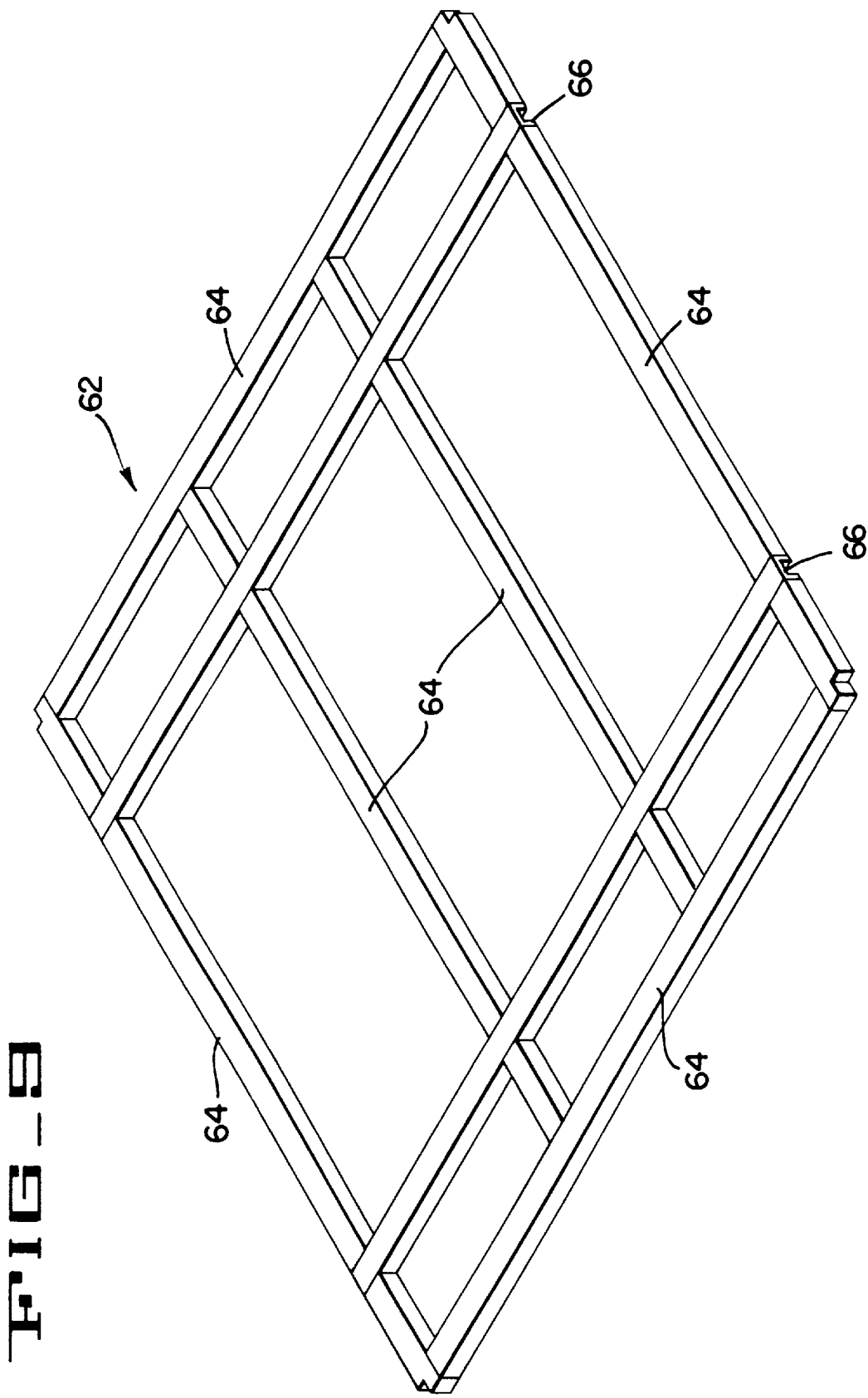

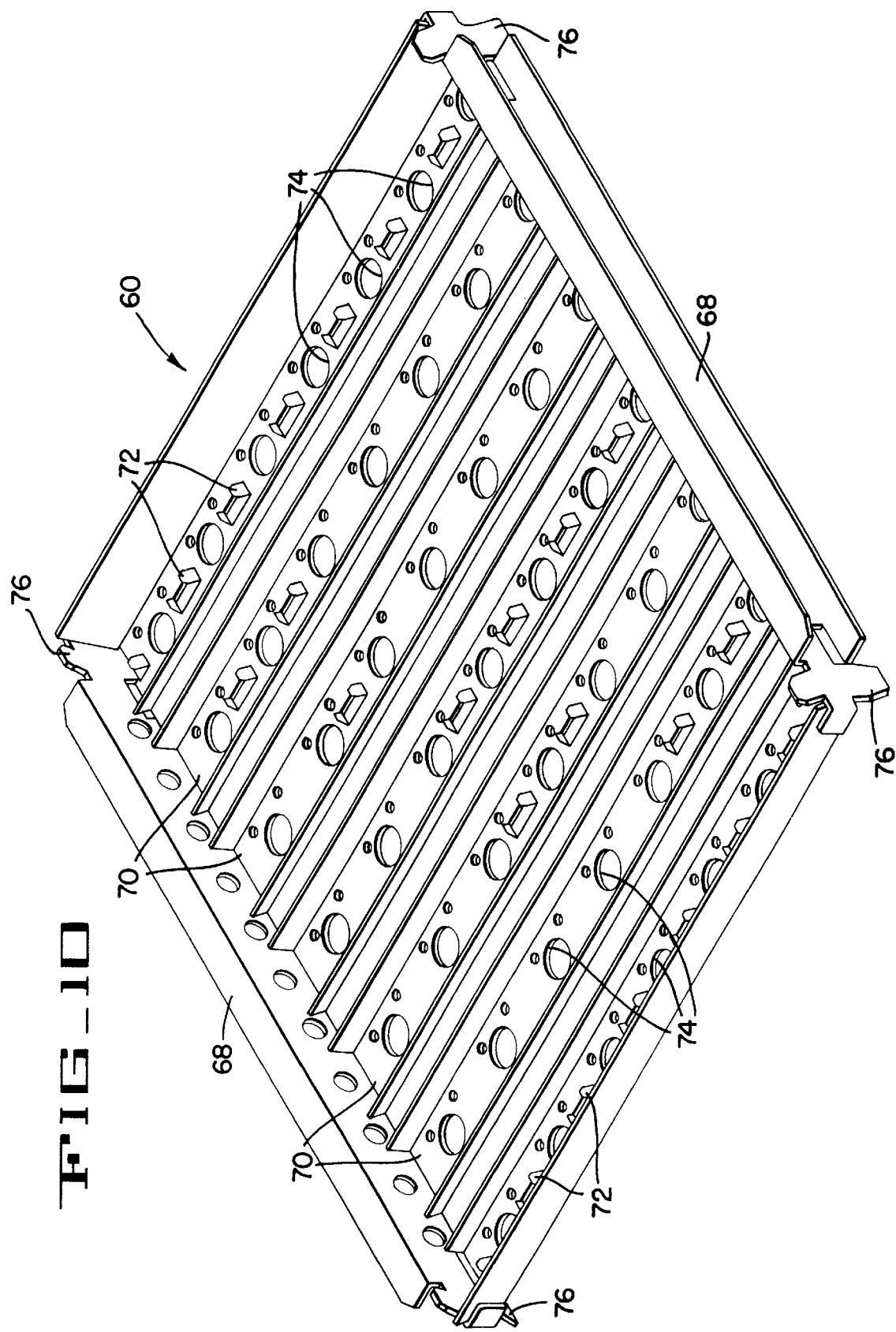
FIG_10

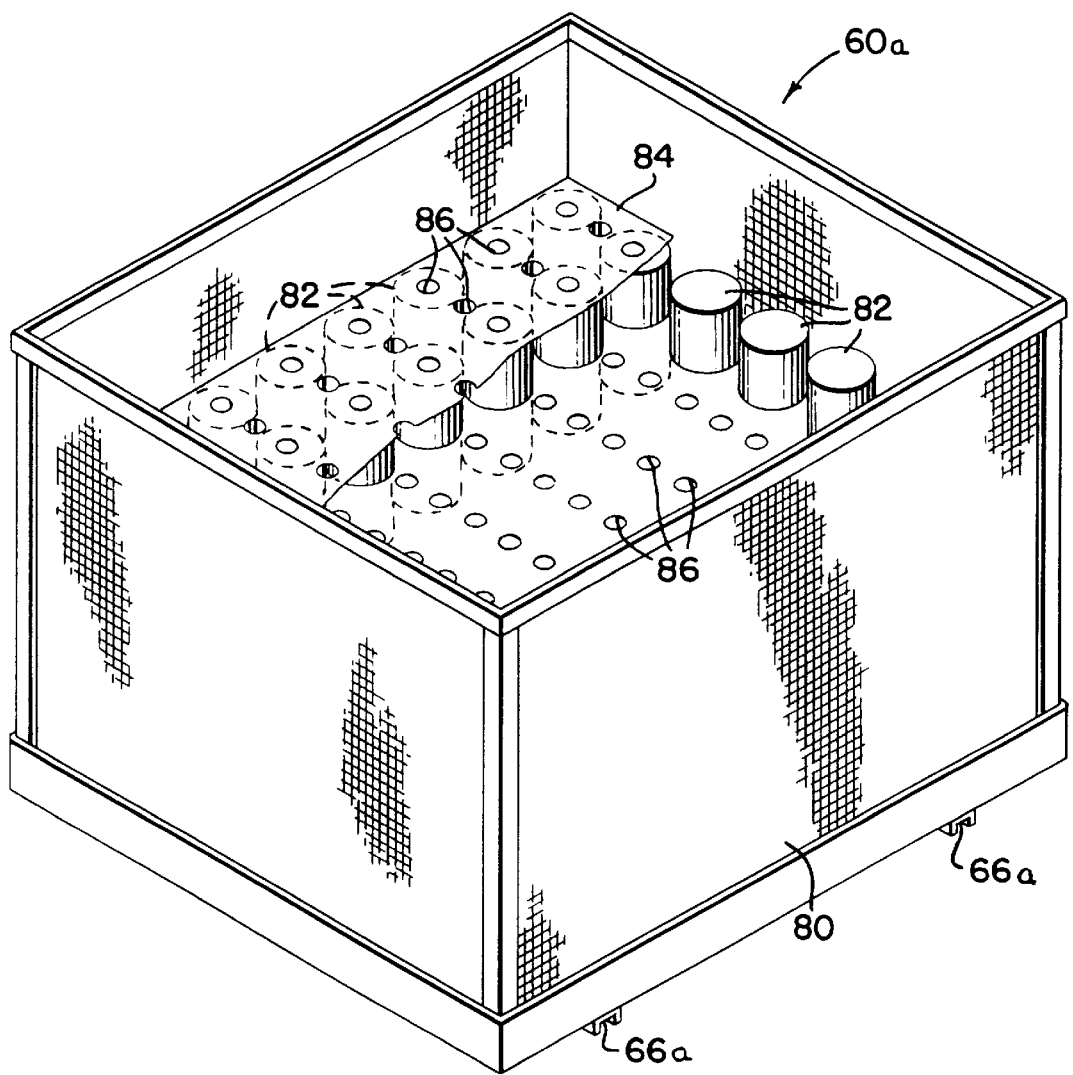

ROTATING VARIABLE HEIGHT CLAMPING DEVICE

This application is a divisional of application Ser. No. 08/483,421, filed Jun. 7, 1995, now U.S. Pat. No. 5,705,127.

The invention relates to a clamping system for a rotary agitating retort. U.S. Pat. No. 2,629,312, which is incorporated by reference, discloses a rotary pressure cooker for cooking and sterilizing large quantities of food. Such prior art rotary agitating retorts, utilized baskets with covers at a set height, and provided all clamping force from the top of the basket. Providing all clamping force from the top of the basket places a detrimental load on wheels or conveyors used to move the basket.

It is an object of the invention to provide a clamping system on a rotary agitating retort which can clamp variable height stacks.

Another object of the invention is to provide a clamping system for variable height stacks which does not place a detrimental load on the wheels or conveyors used to move the stacks.

The invention utilizes a top lost motion clamp to provide a variable height top clamp and a locking mechanism to maintain the top clamp and then the invention utilizes a bottom force low movement clamp to provide additional clamping force in an agitating retort.

FIG. 1 illustrates a partially cut away side view of a rotary agitating retort.

FIG. 2 is a cross-sectional view of the retort illustrated in FIG. 1 along line 2—2.

FIG. 3 illustrates a cross-sectional view of the retort illustrated in FIG. 2 along line 3—3 showing in greater detail the lost motion system.

FIG. 4 illustrates a cross-sectional view of the lost motion system illustrated in FIG. 3 along line 4—4.

FIG. 5 illustrates a cross-sectional view of the lost motion system illustrated in FIG. 4 along line 5—5.

FIG. 6 illustrates a cut away view of the lost motion system illustrated in FIG. 4, with the rack in a lower position.

FIG. 7 illustrates a cut away view of the lost motion system illustrated in FIG. 4 with the rack in its lowest position.

FIG. 8 is a perspective view of a tray stack.

FIG. 9 is a perspective view of a dolly used in the tray stack illustrated in FIG. 8.

FIG. 10 is a perspective view of a tray in a tray stack illustrated in FIG. 8.

FIG. 11 is a perspective view of a basket stack.

FIG. 12 is a detailed view of another embodiment of the invention.

As illustrated in FIGS. 1 and 2, a reel 10 is located inside a retort vessel 12. In this embodiment, the retort vessel 12 has a cylindrical shape with an opening on a first side of the retort vessel 12. A door 14 is used to seal the opening on the first side of the retort vessel 12. Only part of the door 14 is illustrated in FIG. 1. The reel 10 comprises a first circular end piece 16 and a second circular end piece 18, with a plurality of rods 17 extending between the first circular end piece 16 and the second circular end piece 18 and with a plurality of circular supports between the two ends supporting the rods. The second circular end piece 18 of the reel is attached to a rotary support shaft 20, and provides a means for rotating the reel 10 around an axis which passes through the rotary support shaft 20. A first trunion 22 and a second trunion 24 provide additional rotational support to the reel 10. Attached to rods 17 on the bottom of the reel are a pair of conveyors 26, comprising a plurality of wheels 28. The wheels 28 are used to support a stack 30 as the stack 30 is moved into the reel 10. The stack has parallel guides 66, which fit around the wheels 28. The stack 30 is slid into the reel 10 through the open end of the retort vessel 12 and an open end of the reel 10. The first circular piece 16 has a hole to provide the open end of the reel 10. In this embodiment, the reel 10 is large enough to hold four stacks 30. This embodiment of the invention is able to use stacks 30, which are made of a plurality of stacked trays. The stacks will be discussed in more detail below. Above each stack is a separate top supporting plate 32. Each top supporting plate 32 is attached to a separate lost motion system 34 illustrated in more detail in FIGS. 3 to 7. Under each stack 30 are four air cylinders 35, which push lifter members 37 under each stack 30 upward, pushing the stacks upward and providing a clamping force. Air for the air cylinders 35 and wiring for electrical functions inside the reel 10 are provided through the rotary support shaft 20.

FIG. 3 illustrates a top view of the lost motion system 34. FIG. 4 illustrates a cross-sectional view of the lost motion system 34 shown in FIG. 3 taken along line 4—4. FIG. 5 illustrates a cross-sectional view of the lost motion system 34 illustrated in FIG. 4 along line 5—5. The view in FIG. 5 is at a lower height than the view in FIG. 3, which is from above the lost motion system 34. The lost motion system 34 has a guide bar 36 attached to the top supporting plate 32. The guide bar 36 has a length which is approximately perpendicular to the surface of the top supporting plate 32, and has a cross-section which has a C shape. On the end of the length of the guide bar 36 opposite from the top supporting plate 32 is a guide bar cap 38 that ends the groove formed by the C shape cross-section of the guide bar 36. Inside of the groove formed by the C shape cross-section of the guide bar 36 is a rack 40 which has a length and a plurality of rack teeth 42 aligned along the length. The rack 40 is able to slide along the groove in the guide bar 36. Engaged with some of the plurality of rack teeth 42 are some of a plurality of gear teeth 44 on a gear 46. On two sides of the gear 46 are cams 48. The gear 46 and the cams 48 rotate on the same gear axis 50 of rotation. Adjacent to the cams 48 are levers 52, which are attached to a wedge 54. The levers 52 are also attached to a spring mechanism 56, which provides a force to rotate the levers in a clockwise direction as shown in FIG. 4. A support 58 is adjacent to the wedge 54, to provide support to the wedge 54. In this embodiment utilizing four lost motion systems 34, the gear 46 of each lost motion system is driven by a common drive shaft 47, which is driven by a motor 49 in FIG. 1. In another embodiment for a single stack the drive shaft 47 may be driven by a hand crank.

FIGS. 8 to 10 illustrate the stacks 30 which are used in the above embodiment. FIG. 8 is a perspective view of part of a stack 30 comprising a plurality of trays 60 which are stacked on top of each other and supported by a dolly 62.

FIG. 9 is a perspective view of the dolly 62. The dolly comprises frame and support bars 64 upon which the trays 60 rest, and guides 66 for the wheels 28 in the reel 10.

FIG. 10 is a perspective view of a tray 60. The tray comprises two substantially parallel frame rails 68 with a plurality of holding rails 70 extending between the frame rails 68. The holding rails 70 have a plurality of tabs 72 extending from the surface of the holding rails to provide lateral support for cans or other containers placed on the holding rails 70. The holding rails 70 also have a plurality of apertures 74 for allowing steam and water to flow through the trays 60. A plurality of flanges 76 are placed at the corners of the trays 60. The flanges 76 of each tray 60 fit around the corners of the tray 60 or dolly 62 immediately below, thus providing lateral supports between the trays when the trays 60 are stacked upon each other. The top supporting plate 32 would rest on the frame rails 68 of the top tray 60. The frame rails 68 stack on top of each other giving vertical support to the stack 30. This vertical support allows a space between the cans or containers and the holding rails 70 above them and it prevents the weight of the stack from damaging plastic containers.

In operation of the embodiment of the invention that can hold four stacks 30, four top supporting plates 32 are raised to their maximum heights, as viewed in FIG. 4. The supporting plates 32 are raised to their maximum height by rotating each gear 46 in a counter clockwise direction as viewed in FIG. 4. The teeth 44 of the gear 46 push against the teeth 42 of the rack 40 pushing the rack 40 upward to the position shown in FIG. 4. The rack 40 pushes the guide bar cap 38 upward, which pulls the guide bar 36 and the top supporting plate 32 upward. The cams 48 push a first end of the levers 52 down in a counter clockwise direction as viewed in FIG. 4 disengaging the wedge 54.

Once the four top supporting plates 32 are raised to their maximum heights, stacks 30 are conveyed into the reel 10, placing one stack below each top supporting plate. The stacks 30 may have varied heights. In this example the variance is as much as, but not more than five inches.

The top supporting plates 32 are lowered by using the motor 49 to drive the drive shaft 47, which turns the gears 46 in a clockwise direction as viewed in FIG. 4. The motor 49, which is on the outside of the retort vessel 12 has a coupling 51 to allow it to be disengaged from the drive shaft 47 while the reel 10 is rotated. The clockwise rotation of each gear 46 causes each rack 40 to move in a downward direction. The movement of each rack 40 in a downward direction allows gravity to move each guide bar 36 and each top supporting plate 32 in a downward direction. FIG. 6 illustrates a lost motion system 34 where the rack 40 is partially lowered. The guide bar cap 38 is resting on the rack 40 in this position.

Although the stacks 30 are at varying heights, each stack 30 is of a height that allows a support plate to rest on the top of a stack 30 before each rack 40 reaches its lowest position. FIG. 7 illustrates a lost motion system 34 where the rack 40 is in a lowered position. Each top supporting plate 32 is resting on the top of a stack 30. There is a distance 78 between the guide bar cap 38 and the rack 40, which is the distance the rack 40 continued to move downward after the top supporting plate 32 reached the top of the stack 30, stopping the downward movement of the top supporting plate 32, the guide bar 36, and the guide bar cap 38. The continued downward movement of the rack 40 once the top supporting plate 32 stops provides the lost motion of the lost motion system 34. The cam 48 is set so that when the end of the rack 40 is reached a stop bolt 79 hits a stop tab 80, preventing further rotation of the cam 48 and gear 46. At this point the levers 52 are adjacent to a thinner place in the cam 48 allowing the spring mechanism 56 to rotate the levers in a clockwise direction, causing the wedge 54 to press against the guide bar 36. The pressing of the wedge 54 against the guide bar 36, provides a means for locking the top support plate 32 in position against the top of the stack, once the rack 40 has reached its lowest position. The lost motion system 34 allows stacks in this embodiment of the invention to vary in height by as much as five inches, and with a common drive provides a system which locks the top supporting plates on top of each of the varying height stacks. Tab 38 extends to the right to provide a stop for the downward movement of the top support plate 32 if a stack is not present.

After the top supporting plates 32 are locked in place on top of the stacks 30, air cylinders 35 push the lifter members 37, which push the bottom of the stacks 30 upward against the top supporting plates, providing clamping force. Since the top supporting plates 32 are locked in place on the varying height stacks 30, the air cylinders 35 need to provide very little movement, allowing a minimization of the volume of the air cylinders 35. In this embodiment, the air cylinders 35 move the stacks 30 less than one inch. By providing clamping force from the bottom of the stacks 30 force on the wheels on the conveyor 26 is eliminated, preventing degradation of the conveyor 26.

After the clamping force is applied by the air cylinders 35, the reel 10 is rotated by rotating the rotary support shaft 20, and steam or other means are used to heat the inside of the retort vessel. During the agitation, the stacks may settle and diminish in height by a fraction of an inch. The air cylinders 35, are able to push the lifter members 37 and the bottom of the stacks 30 up an amount equal to the change in height of the stack 30 due to settling. The air cylinders 35 are able to keep a substantially constant clamping force even though the height of the stack 30 has changed during agitation. Once the desired sterilization process is accomplished, the rotation of the reel is stopped, placing the stacks 30 in an upright position.

The pressure in the air cylinders 35 is released, releasing the clamping force on the stacks. The motor 49 drives the drive shaft 47 to turn the gears 46 and cams 48 in a counter clockwise direction as viewed in FIG. 4. The turning of the cams 48 in a counter clockwise direction causes the cams to push the levers 52 in a counter clockwise direction pushing the wedge 54 away from the guide bar 36, unlocking the guide bar 36 and the top supporting plate 32. In rotating the gear 46 in a counter clockwise direction, the teeth 44 of the gear 46 push against the teeth 42 of the rack 40 pushing the rack 40 upward. The rack 40 pushes the guide bar cap 38 upward, which pulls the guide bar 36 and the top supporting plate 32 upward.

The stacks 30 are moved on the conveyor 26 out of the reel 10 and retort vessel 12.

The invention may utilize other lost motion systems such as a lever and chain mechanism or a ratchet. The invention may utilize other locking mechanisms such as a latch.

The invention may be used for other types of clamping purposes besides agitating retorts, such as in the curing of rubber.

In the invention a stack may be a stack of trays or may be other objects. FIG. 11 is a perspective view of a stack in the form of a basket stack 60a. The basket stack comprises a rectangular basket 80 with guides 66a on the bottom for guiding the wheels 28. Different layers of containers 82 are placed in the basket 80 with layers of plastic 84 or some other material with apertures 86 placed between the layers of containers 82. The top supporting plate 32 fits in the sides of the rectangular basket 80 to apply force on the layers of containers 82. A single block of material may form a stack. A plurality of bins may also form a stack.

The air cylinders 35 may be replaced by other means for placing a force on the bottom of the stacks, which lifts the stacks and provides a clamping force. Preferably this means for providing such a force should be a means for providing a substantially constant force even though the stack may have a changing height making the stack shorter or longer during the agitation or heating of the stack. Such preferred means may be a fluid lift such as an air cylinder or hydraulic lift, or such preferred means may be mechanical if it has a drive which will actively adjust during agitation or heating so that if the stack gets shorter or longer the mechanical mechanism will move to provide a substantially constant force to the bottom of the stack.

FIG. 12 illustrates part of another embodiment of the invention. This embodiment is identical to the embodiment illustrated in FIG. 1, except that the motor 49 and coupling 51 are replaced by a rack 86, a gear drive 88, a bi-directional air cylinder 90, a spring loaded air cylinder 92 and a lock 94. The gear drive 88 is connected to and drives the drive shaft 47. The gear drive 88 is driven by the rack 86. The rack 86 is moved by a shaft 96 of a piston, which forms part of the bi-directional air cylinder 90. The body of the air cylinder 90 is attached to the reel 10, allowing the drive mechanism to rotate with the reel 10 inside of the retort vessel. Air pressure is provided along a first air line 99 to push the piston to the right as shown in FIG. 12, which pushes the rack to the right and rotates the drive gear 88 in a counter-clockwise direction. The counter-clockwise movement of the drive shaft 47 causes the lost movement systems 34 to raise the top supporting plates 32. Once the top supporting plates are in a fully raised position, the movement of the rack 86 to the right stops, and a spring 97 in the spring loaded air cylinder 92 moves the lock 94 into a position to prevent the rack 86 from moving to the left. When air pressure is provided along a second air line 95, air pressure passes from the bidirectional air cylinder through a third air line 93 to the spring loaded air cylinder 92. The air pressure in the spring loaded air cylinder 92 provides a counter force to the spring 97, pushing the lock 94 into a position which allows the rack 86 to move to the left. The air pressure provided by the second air line 95 pushes the piston 98 to the left, pushing the rack 86 to the left. The movement of the rack 86 to the left rotates the drive gear 88 in a clockwise direction, which causes the lost movement systems 34 to lower the top supporting plates 32.

While preferred embodiments of the present invention have been shown and described herein, it will be appreciated that various changes and modifications may be made therein without departing from the spirit of the invention as defined by the scope of the appended claims. ML:smb

What is claimed is:

1. A method of clamping stacks, comprising the steps of:
   lowering a top member to the top of a stack by the movement of a first drive system through a predetermined distance;
   stopping the top member on the top of the stack by engagement of the top member with the stack, while the first drive system continues to move through the predetermined distance;
   locking the top member; and
   lifting the stack from a bottom stack support such that the stack is clamped against said top member when in a locked position,
   whereby movement of the first drive system through the predetermined distance allows for variable movement of the top member, which in turn allows for clamping of stacks with varying heights.

2. A method, as claimed in claim 1, wherein the step of lifting the stack uses at least one fluid lift to push on the bottom of the stack upwards.

3. A method, as claimed in claim 2, wherein the step of lowering the top member, comprises the steps of:
   rotating a gear drive with teeth;
   lowering a rack with teeth which mate with the teeth of the gear drive; and
   lowering a guide surrounding part of the rack, wherein the guide is attached to the top member.

4. A method, as claimed in claim 3, wherein the step of locking the top member, comprises the steps of:
   rotating a cam in relation to the gear;
   pushing a lever with the cam; and
   pushing a wedge with the lever.

5. The method of claim 1 wherein,
   movement of the first drive system through the predetermined distance is sufficient to allow stacks of a variety of different stack heights to be clamped.

6. The method of claim 1 wherein,
   the step of lowering the top member is performed by moving a guide member in a manner that allows the top member to move by gravity into engagement with the stack.

7. The method of claim 6 wherein,
   the guide member is movable through the predetermined distance.

8. A method of clamping a plurality of stacks, comprising the steps of:
   lowering a top member to the top of each stack by movement of a first drive system through a predetermined distance,
   stopping each top member by engagement with the top of its respective stack, while the first drive system continues to move through the predetermined distance,
   locking each top member, and
   lifting each stack from a bottom stack support such that each stack is clamped against each top member when in their respective locked positions,
   whereby movement of the first drive system through the predetermined distance allows for clamping of stacks with varying heights.

9. The method of claim 8 wherein,
   movement of the first drive system through the predetermined distance is sufficient to allow stacks of a variety of different stack heights to be clamped.

10. The method of claim 8 wherein,
    the step of lowering each top member is performed by moving a guide member for each top member in a manner that allows each top member to move independently of the other top members by gravity into engagement with the stack.

11. The method of claim 10 wherein,
    each guide member is movable through the predetermined distance.

* * * * *